United States Patent
Kramer

(10) Patent No.: US 7,434,202 B2
(45) Date of Patent: *Oct. 7, 2008

(54) SYSTEM AND METHOD FOR SOFTWARE COMPONENT DEPENDENCY CHECKING

(75) Inventor: Reto Kramer, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 610 days.

This patent is subject to a terminal disclaimer.

(21) Appl. No.: 10/785,757

(22) Filed: Feb. 24, 2004

(65) Prior Publication Data

US 2004/0168152 A1    Aug. 26, 2004

Related U.S. Application Data

(63) Continuation-in-part of application No. 10/655,059, filed on Sep. 4, 2003, now Pat. No. 7,076,764.

(60) Provisional application No. 60/450,839, filed on Feb. 28, 2003, provisional application No. 60/408,697, filed on Sep. 5, 2002.

(51) Int. Cl.
*G06F 9/44* (2006.01)

(52) U.S. Cl. ........................ 717/120; 717/102; 717/117

(58) Field of Classification Search ......... 717/100–122, 717/168–178
See application file for complete search history.

(56) References Cited

U.S. PATENT DOCUMENTS

| | | | |
|---|---|---|---|
| 5,640,567 A | 6/1997 | Phipps | |
| 6,442,753 B1 * | 8/2002 | Gerard et al. | 717/170 |
| 6,442,754 B1 * | 8/2002 | Curtis | 717/175 |
| 6,725,452 B1 * | 4/2004 | Te'eni et al. | 717/168 |
| 2002/0129347 A1 | 9/2002 | Fischer | |
| 2003/0018963 A1 | 1/2003 | Ashworth et al. | |
| 2003/0131338 A1 | 7/2003 | Georgalais | |
| 2004/0015540 A1 | 1/2004 | Solano et al. | |
| 2004/0015833 A1 | 1/2004 | Dellarocas et al. | |
| 2004/0015946 A1 | 1/2004 | Teeni et al. | |
| 2004/0015994 A1 | 1/2004 | Te'eni et al. | |
| 2004/0205689 A1 | 10/2004 | Ellens et al. | |

OTHER PUBLICATIONS

Reto Kramer, iDarwin—The Java Software Architecture Evolution Tool, Feb. 15, 2000, retrieved online <http://jugs.ch/html/events/2000/iDarwin.ppt>, pp. 1-31.*

(Continued)

*Primary Examiner*—Eric B. Kiss
*Assistant Examiner*—Zheng Wei
(74) *Attorney, Agent, or Firm*—Fliesler Meyer LLP

(57) ABSTRACT

A system and method for use with an enterprise system or software development system, for determining or checking for dependencies between software components, or between other components of said system. The system utilizes a module architecture specification language and toolkit to check system code for compliance against a set of rules or requisites. The module architecture specification can be structured into product-wide groundrules applicable to all subsystems, subsystem-, layer-, module-specific, and thin-client/server rules. In accordance with one embodiment, the system can be used to allow, forbid, or constrain certain dependencies between software modules, or between the building blocks, organization components, or products that make up a large enterprise system.

23 Claims, 9 Drawing Sheets

OTHER PUBLICATIONS

Zisman-Emmerich-Finkelstein, Using XML to Build Consistency Rules for Distribution Specification, IEEE, Nov. 2000, Proceedings of the Tenth International Workshop on Software Specification and Design, sections 2-5.

Tools for VisualAge version 2.0, 3.0 and Beyond, Aug. 2001, http://web.archive.org/web/20010803042309/http://javadoc.com/vaj/resources/tools2x.html.

International Search Report dated Jun. 5, 2007, for Application No. PCT/US03/27851, 4 pages.

* cited by examiner

SYSTEM AND METHOD FOR SOFTWARE
COMPONENT DEPENDENCY CHECKING

CLAIM OF PRIORITY

This application claims priority to U.S. Provisional Patent Application 60/450,839, filed Feb. 28, 2003, entitled "SYSTEM AND METHOD FOR SOFTWARE COMPONENT DEPENDENCY CHECKING", and incorporated herein by reference. This application is also a Continuation-In-Part of copending U.S. patent application Ser. No. 10/655,059, filed Sep. 4, 2003, entitled "SYSTEM AND METHOD FOR SOFTWARE MODULE ARCHITECTURE LANGUAGE AND COMPLIANCE"; which claims priority from U.S. Provisional Patent Application No. 60/408,697 filed Sep. 5, 2002 entitled "SYSTEM AND METHOD FOR MODULE ARCHITECTURE LANGUAGE AND COMPLIANCE CHECKING", both of which are incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and software development systems, and particularly to a system and method for determining or checking for dependencies between software components, or between other components of said system.

BACKGROUND

Each day, software systems become increasingly more complex, both in terms of what they do, and the amount of software development that goes into creating them. A problem with developing such complex software systems is the need to manage dependencies between the various components that comprise the system. This is especially a problem with enterprise level systems that include many organizational components, and have many, hundreds perhaps, of such interdependencies that must be tracked and managed if the software system is to operate reliably and as expected.

With an enterprise system the problem must be assessed at various levels. For example, an enterprise level ecommerce system may comprise many different organization components, such as a foundation server product, a B2B or integration product, and perhaps a B2C ecommerce product. An example of such an enterprise system is BEA's WebLogic platform, which includes a server product (WebLogic Server), together with optional Integration components, Portal components, etc. In this type of environment, the "components" are often full-blown software products in their own right, but are typically packaged together with the server product for marketing reasons and to suit the needs of customers. The individual organization components are often optional, so they may or may not be present in any one enterprise deployment. Importantly, the individual components may also have been developed separately, by different teams of software engineers, and even different companies.

An important aspect of this development process is ensuring each organization component behaves itself with respect to all other components, and that any function calls which one component may make on another component are valid and allowable. These are often referred to as "dependencies". Otherwise, if dependencies are not managed properly inconsistencies will show up in one or all of the affected components.

At another level, within a particular organization component, for example within the WebLogic Server product itself, that organization component or piece of the enterprise system will itself have many components. For example, in the case of an application server, the application server might include a JMS (JAVA™ MESSAGING SYSTEM) component, a http Servlet component, and an EJB (ENTERPRISE JAVA™ BEAN) component, among others. As with the larger scale view, each of the components at this level must interact correctly, and dependencies between the components must be managed properly. At this level, dependencies may be even more critical, since the operation of a particular component can be made or broken on the success or absence of a particular dependency. However, the dependency is often subtle and difficult to catch.

At a third level, the enterprise system usually interacts with other system, particularly clients. A client interacts typically by making function calls and accessing classes at the enterprise system. With a move to thinner clients, the need for knowing just which classes need be present at the client, and which can remain at the server, becomes a more important issue. Viewed from this aspect, the client and the server include dependencies that must be assessed and properly managed in order to make the client as thin as possible and still ensure reliable performance.

To date, little has been done to address these issues. Their exists a variety of software development tools that allow a developer to test their application again a set of pre-ordained rules. However, these rules are difficult to maintain and update, and in any case are of less use in detecting unusual situations, that would otherwise slip through a normal rule-checking process. Traditional systems are also useless for any for of serendipitous dependency checking for purposes of getting a good overview of the entire enterprise systems' dependencies. Traditional rules often fail when dealing with the subtleties present in inter-component relations. Tools that address these problems, and also assist in driving the overall software development process are of great use.

SUMMARY

The invention provides a system and method for use with an enterprise system or software development system, for determining or checking for dependencies between software components, or between other components of said system. The system utilizes a module architecture specification language and toolkit to check system code for compliance against a set of rules or requisites. The module architecture specification can be structured into product-wide groundrules applicable to all subsystems, subsystem-, layer-, module-specific, and thin-client/server rules.

In accordance with one embodiment, the system can be used to allow, forbid, or constrain certain dependencies between software modules, or between the building blocks, organization components, or products that make up a large enterprise system (which is essentially a very large scale "software project"). When the enterprise system is built, for example at compile-time, the dependencies can be checked and verified against the rules. This serves as a positive check on the consistency of dependencies within the software project according to predefined architecture design/rules, and also allows a system architect or quality assurance (QA) or architecture team to identify dependencies that may contravene those rules. A decision may then be made as to whether to, for example, change the rules, or eliminate the errant dependency. From another aspect the system can be used to allow, forbid, or constrain certain dependencies between software modules or components within a particular organization component, i.e. with in the server product, or with in the ecommerce or portal product. Other embodiments of the system can be used to allow, forbid, or constrain certain dependencies between a client or application and a server-based system, for example between a thin client and an application server. Constraining dependencies helps to ensure that the client stays thin. At all levels the system can also be used to provide useful dependency information describing the dependency relationships between the various components, and provide this information to an operator in a useful manner, allowing for critical analysis and serendipitous viewing of the entire architecture of the project. This promotes good software development methodologies and the development of consistent and reliable systems.

DETAILED DESCRIPTION

Figure 1:
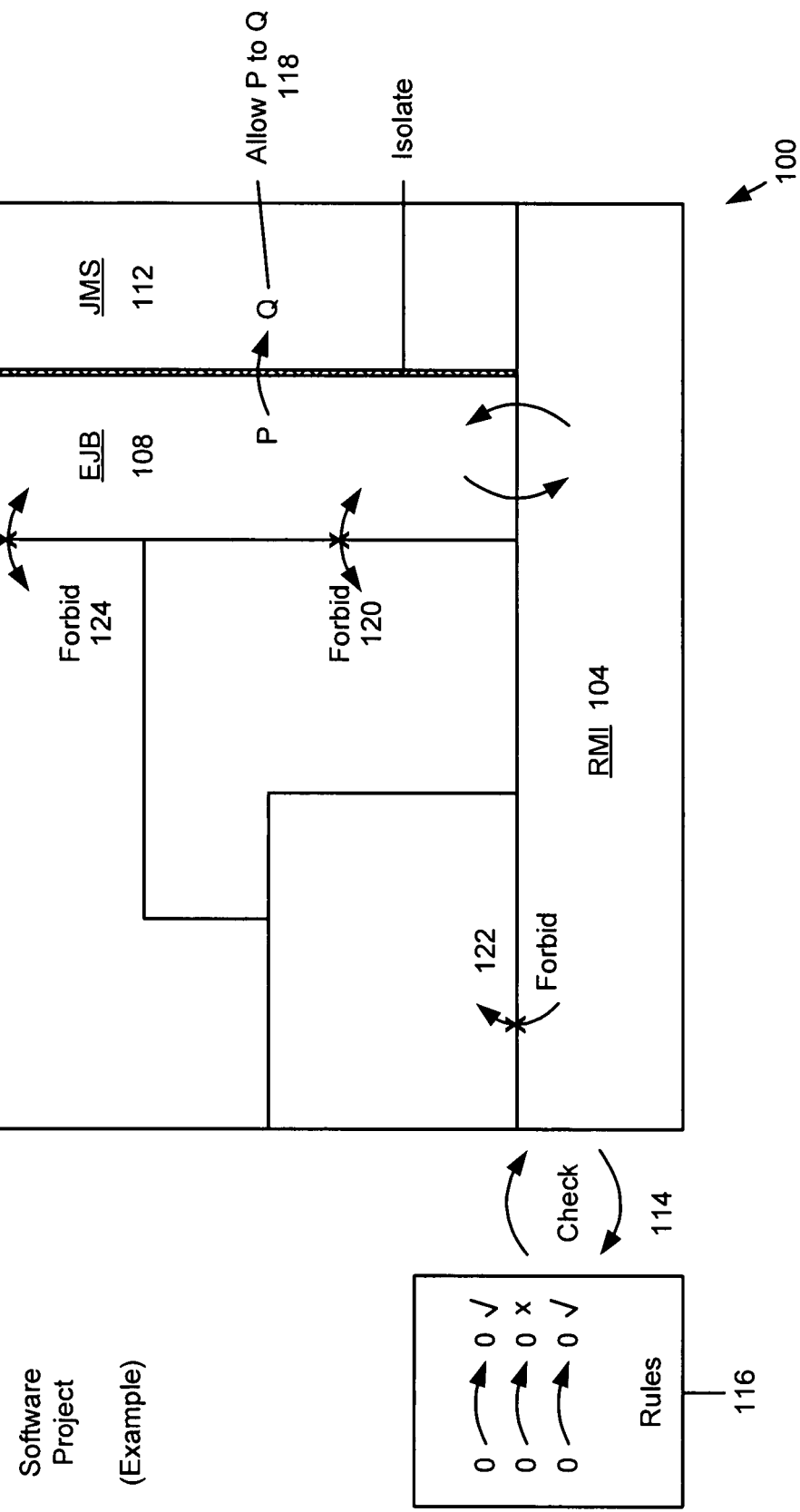
FIG. 1 shows an example of a software project including multiple modules that may be used with an embodiment of the invention.

The invention provides a system and method for use with an enterprise system or software development system, for determining or checking for dependencies between software components, or between other components of said system. The system utilizes a module architecture specification language and toolkit to check system code for compliance against a set of rules or requisites. The module architecture specification can be structured into product-wide groundrules applicable to all subsystems, subsystem-, layer-, module-specific, and thin-client/server rules.

The embodiments of the invention disclosed herein make use of the dependency checking and compliance techniques described in further detail in copending application "SYSTEM AND METHOD FOR MODULE ARCHITECTURE LANGUAGE AND COMPLIANCE CHECKING"; Ser. No. 10/655,059; filed Sep. 4, 2003, and incorporated by reference herein. Disclosed therein is a system and method for module architecture specification and a toolkit that helps developers maintain and control the module dependency structure of their products in a pragmatic, cost effective way over the long lifetime of large-scale, development and maintenance projects. As referred to therein "IDARWIN" is a specification language with a set of tools that check JAVA™ programming language source-code and class files for adherence to a set of specifications. Unlike "module architecture diagrams" (the typical picture of layered software) which are highly ambiguous, an IDARWIN module architecture specification is precise and can be checked automatically. If, over time the code deviates from the desired structure, developers can be alerted without delay and can either revise the module architecture description, or remove non compliant code dependencies.

Load-time linking in JAVA™ programming language makes the issue of dependency creep particularly acute. While one can maintain layer- or subsystem-dependencies using build systems such as "make' or "ant", by carefully controlling the classpath that is presented to the compiler runs for each subsystem, in practice this is done very rarely, since it is tedious and hard to adapt. As a result, a lower layer in a system can unintentionally start to depend on a higher layer due to a code-change. The IDARWIN approach determines static dependencies among classes and interfaces in JAVA™ programming language source and class files. Next it reads a set of module architecture specification files which it composes into a single compound specification and then checks each code dependency against the compound specification to find the code dependencies that violate the module architecture; the code dependencies that evade coverage by statements in the specification; and redundant and obsolete specification statements. A key feature is the ability to present multiple specifications to IDARWIN, so as to allow subsystem and layer owners to author their own specifications from their perspective. These views will sometimes overlap and IDARWIN contains a sophisticated mechanism to detect and resolve contradictory specification statements.

The present invention discloses a variety of embodiments in which the IDARWIN approach can be used to provide a software development environment by which software developers (programmers, architects, etc.) can formulate rules that are to be followed during the development of a particular "software project". Particularly, these rules can be defined so as to allow, forbid, or constrain certain dependencies between software objects within the project. On a larger scale, the system can be used to allow, forbid, or constrain certain dependencies between software modules, or between the building blocks, organization components, or products that make up a large enterprise system (which is essentially a very large scale "software project"). When the enterprise system is built, for example at compile-time, the dependencies can be checked and verified against the rules. This serves as a positive check on the consistency of any dependencies within the software project according to predefined architecture design/ rules, and also allows a system architect or quality assurance (QA) or architecture team to identify dependencies that may contravene those rules. A decision may then be made as to whether to, for example, change the rules, or eliminate the errant dependency. From another aspect the system can be used to allow, forbid, or constrain certain dependencies between software modules or components within a particular organization component, i.e. within the server product, or within the ecommerce or portal product. Other embodiments of the system can be used to allow, forbid, or constrain certain dependencies between a client or application and a server-based system, for example between a thin client and an application server. Constraining dependencies h&ps to ensure that the client stays thin. At all levels the system can also be used to provide useful dependency information describing the dependency relationships between the various components, and provide this information to an operator in a useful manner, allowing for critical analysis and serendipitous viewing of the entire architecture of the project. This information can be provided in the form of a Web page that shows each component and the dependencies found by the system, including highlighting those dependencies that violate any rules. Alternatively each check can be used to generate email messages that are then sent to the appropriate software developer or architect informing them that their application or component includes a dependency on another component, and whether it violates a particular rule. When performed regularly (in many instances each day, or each hour, etc.) this process promotes good software development methodologies, and the development of consistent and reliable systems.

An important feature is the ability to present multiple specifications to IDARWIN, so as to allow both subsystem and layer "owners", i.e. the developers of these components, to author their own specifications from their individual perspective. These alternate views will sometimes overlap and in these cases IDARWIN contains a sophisticated mechanism to detect and resolve contradictory specification statements.

In practice, the IDARWIN system in accordance with one embodiment of the invention may be used to provide a software development environment by which software developers (programmers, architects, etc.) can formulate rules that are to be followed during the development of a "software project",i.e. a typically complex multi-module, multi-component, or multi-object software application. Particularly, these rules can be defined so as to allow, forbid, or constrain certain dependencies between software objects within the project. On a larger scale, the system can be used to allow, forbid, or constrain certain dependencies between software modules, or between the building blocks of large enterprise systems (essentially a larger scale "software project"). When the software project or enterprise system is built, for example at compile-time, the dependencies can be checked and verified against the rules. This serves as a positive check on the consistency of dependencies within the software project according to predefined architecture design/rules, and also allows a system architect or quality assurance (QA) team to identify any dependencies that may contravene those rules. A decision may then be made as to whether to, for example, change the rules, or eliminate the errant dependency.

FIG. 1 illustrates an example 100 of the type of software project or enterprise level system that may benefit from the use of the invention. As shown in FIG. 1, a software project may include various modules, such as RMI 104, EJB 108, and JMS 112 modules, each of which may be under the control of an individual software developer or development team. During compilation, (which in fast-moving businesses with lots of builds can take place every 60 minutes or so), dependencies between the software modules can be identified, and in accordance with an embodiment of the invention, checked 114 against a set of rules 116. Some rules 112 may specifically allow certain dependencies between the modules. Other rules 120, 122, 124 may specifically deny or forbid other such dependencies. Oftentimes the individual rules may be contradictory in what they allow or forbid, and require clarification. The set of rules themselves can be gathered from multiple sources, checked for consistencies, and sorted or rewritten for efficiency. In this way, each of the software modules can be independently developed with less concern that the calls they either make to other modules, or allow from other modules, will contravene the architecture rules laid down for the development of the entire software project or system. This allows large-scale projects to be developed by many different software developers or development teams, each perhaps with their own style and way of programming, while ensuring a consistency among the dependencies within the project. The result is a faster and more efficient development time, coupled with a more consistent and bug-free end product.

Figure 2:
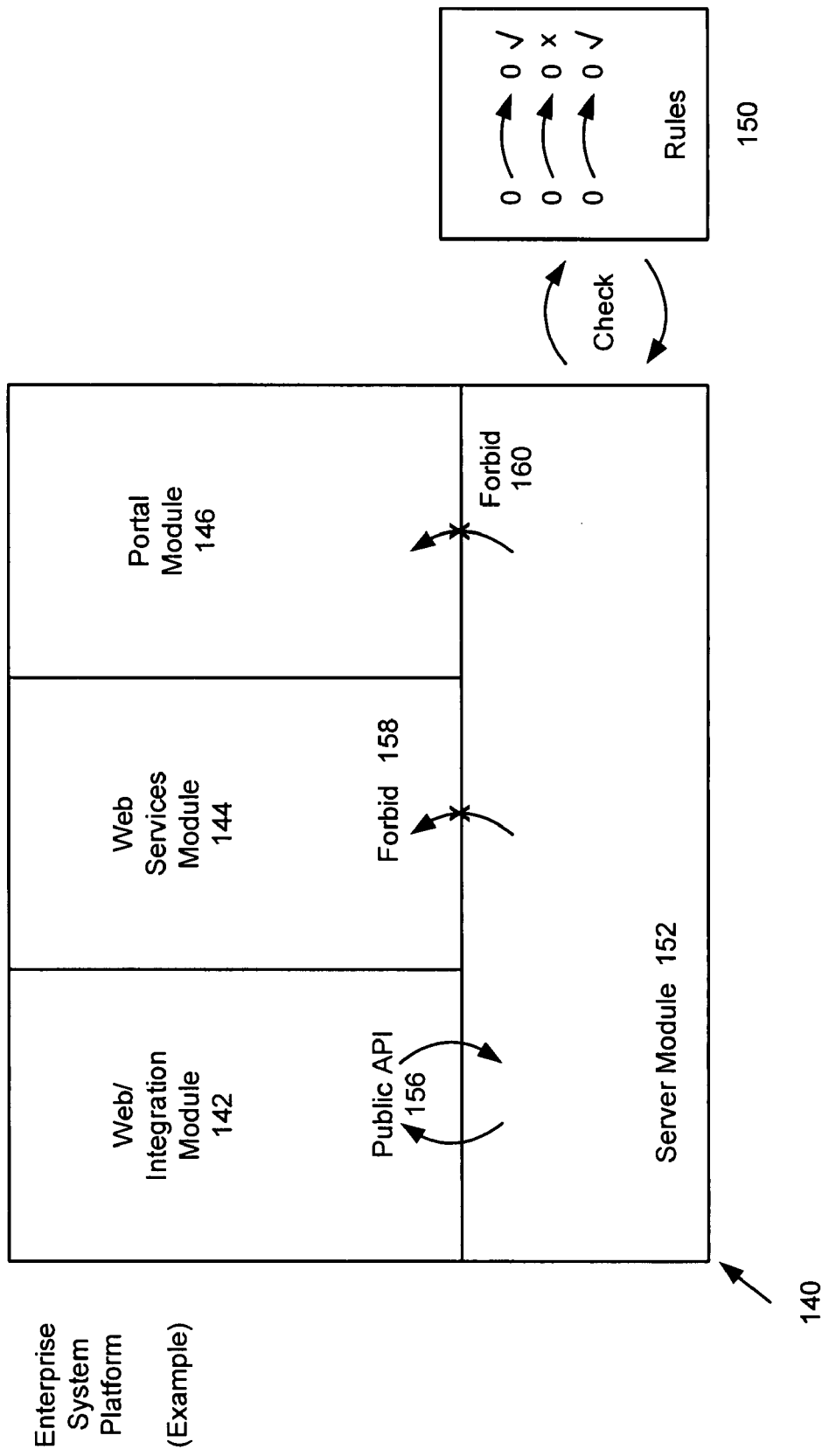
FIG. 2 shows an example of another software project including multiple modules that can be used with an embodiment of the invention.

FIG. 2 illustrates an alternate embodiment in which the compliance-checking system in accordance with the invention is used on an enterprise platform level to monitor dependencies between software components within a large scale system 140. Some components, such as a Web Integration Module 142, a Web Services module 144, a Portal module 146, and the like, may be defined by the rules as for example not being allowed to rely (i.e. are forbidden 158, 160 from relying) on other components for certain operations, i.e. they must operate independently as standalone components. Other rules may allow one component to talk to another component, for example a server module 152, via a public interface (API) 156. Using a rules-based module architecture checking system as described herein ensures that when the individual components are shipped to the marketplace, there is less chance that they will fail later because of an undiscovered dependency problem.

Figure 3:
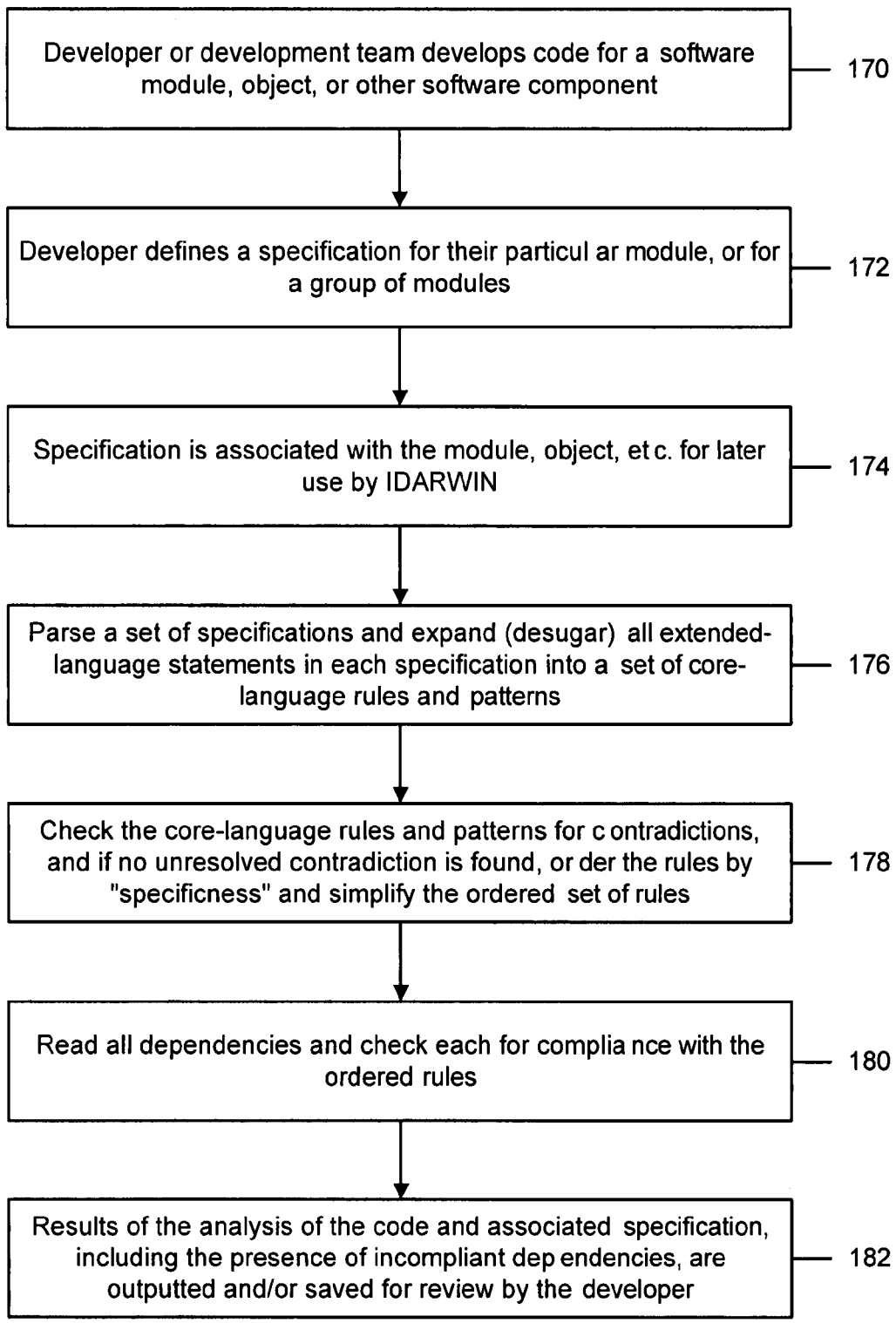
FIG. 3 shows a flowchart of a compliance checking process in accordance with an embodiment of the invention.

FIG. 3 shows a flowchart of a process in accordance with an embodiment of the invention illustrating how the IDARWIN system is used to assist a developer in maintaining consistency of their code. As shown in FIG. 3, in step 170, a developer or development team develops code for a software module, object, or other software component. In step 172, the developer is allowed to define a specification for their particular module, or for a group of modules. The specification defines any dependencies or restrictions that should preferably be associated with their module, for example dependencies on other modules, isolations, or layering. In step 174 the specification is associated with the module, object, etc. for later use by IDARWIN. Steps 176, 178 and 180 are performed by the IDARWIN system. Typically, steps 176 and 178 are performed each time the specification for a module is changed, while steps 176,178 and 180 are performed any time the module's code is changed together with the specification. In step 176 a set of specifications is parsed and all extended-language statements are expanded (desugared) in each specification into a set of core-language rules and patterns. In step 178, the set of all core-language rules and patterns is checked for contradictions, and if no unresolved contradiction is found, the rules are ordered by "specificness", and the ordered set is simplified. In step 180, all dependencies are read and each is checked for compliance with the ordered rules. In step 182, the results of the IDARWIN analysis of the code and associated specification, including the presence of incompliant dependencies, is output or saved for later review by the developer.

Platform Level Dependency Checking

Figure 4:
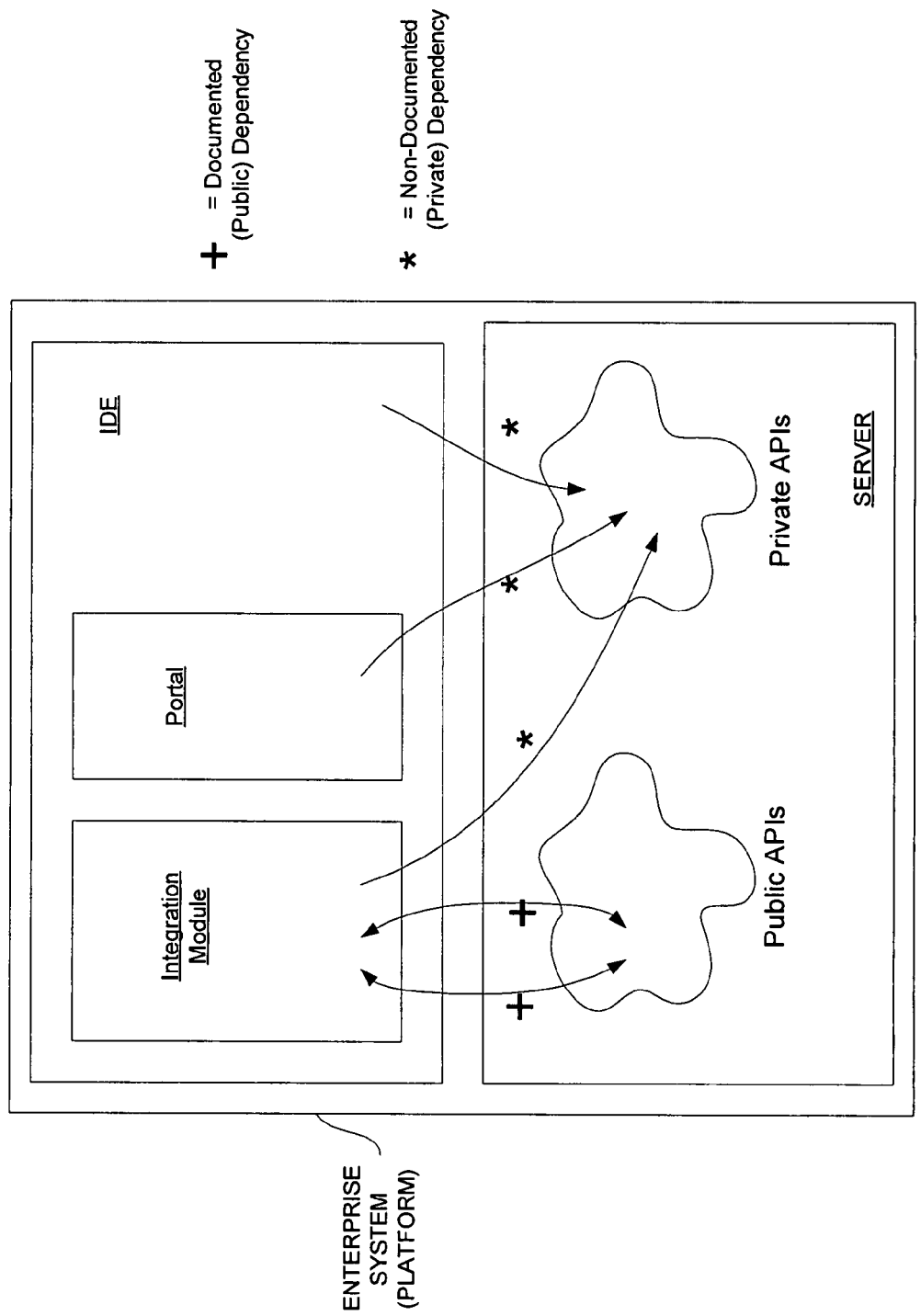
FIG. 4 shows an illustration of an enterprise level system, including organization components, and dependencies between said organization components, in accordance with an embodiment of the invention.

FIG. 4 illustrates one embodiment in which the rules-checking system in accordance with the invention is used on a enterprise platform level to monitor dependencies between software organization components of a large scale or enterprise system. FIG. 4 shows an illustration of an enterprise level system, including organization components, and dependencies between said organization components. Some components, such as a Server Module, Web Integration Module, Web Services module, or a Portal module, may be considered products in their own right. They are often marketed as add-on options, and in many cases are developed by different teams of developers according to different development timelines. For all intents and purposes, they may be considered independent components apart from their interactions with the other components. Using the IDARWIN approach rules can be defined as to how each component must interact with another, for example by not being allowed to rely on other components for certain operations, i.e. they must operate independently as standalone components. Other rules may allow one component to talk to another component via a public interface (API). Using a rules-based module architecture ensures that when the individual components are shipped to the marketplace, there is less chance that they will fail because of an undiscovered dependency problem.

As shown in the example of FIG. 4, the software enterprise system or platform includes a server product, an integration product, a portal product, and an integrated development environment (IDE) product. In this example, many of the software products depend on the server product for various functions, features, routines, etc. Some of these functions will be through publically available and documented application program interfaces (APIs). Others may be through private or undocumented APIs. While the use of publically documented APIs is not usually a concern for the purposes of system stability (although their use is still important for purposes of system performance and architecture planning), the use of private APIs is usually of great concern. Private APIs are most often used by product developers when they wish to harness a particular feature of another product and there is no documented way to satisfy this need. While they are obviously of great use in certain circumstances, they pose a potential problem further down the line should, say, the undocumented API be removed or no longer supported in the server product. If this was to happen, then that feature or routine might no longer be available to the dependant products, causing likely failure of some aspect of those products. Using the IDARWIN approach, the entire enterprise system can be checked on a regular basis, for example once a day during the nightly compilation. Dependencies between the organization components or products can be found and compared to a preordained set of rules. The results can then be made available through, for example, a graphical result screen, Web page, or set of email messages. Individual rules may allow a dependency to exist, or may forbid a dependency. The system is also particularly useful in finding dependencies that crop up for which no prior rule may have been ordained. The results can be evaluated by the enterprise system architect and/or the responsible developers to determine the best approach to take, which may include allowing the dependency to exist (and propose a new rule accordingly), rewrite the code to eliminate the dependency, or rewrite the code to use a different type of dependency that is more agreeable. In this manner the system can be used for requirements analysis to assist in determining whether, for example, a private API should be moved into the public API realm.

Figure 5:
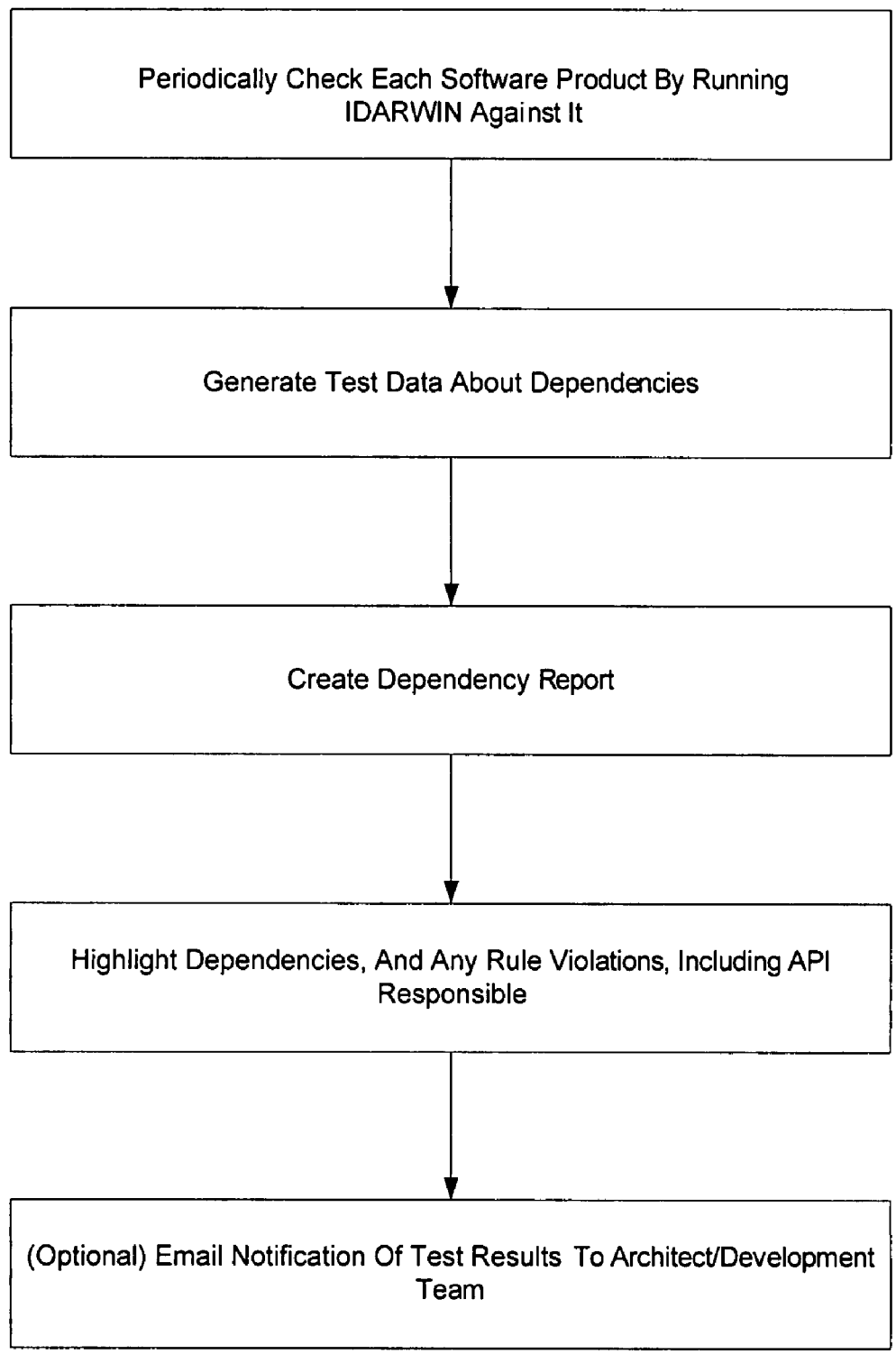
FIG. 5 shows a flowchart of a process for checking dependencies between organization components, in accordance with an embodiment of the invention.

FIG. 5 shows a flowchart of a process for checking dependencies between organization components, in accordance with an embodiment of the invention. As shown in FIG. 5, on a periodic basis (or singly-initiated) the system tests each software organization component or product by running IDARWIN against each product. The system is used to generate a complete set of status data for the tests. This information is then used to create a report, for example a spreadsheet, or Web page. The test results may also be emailed to an appropriate system architect or developer to allow them to take action. Some embodiments also create a master status sheet illustrating each dependency issue the system found, including for example, whether the dependency did or did not violate an existing rule, which software component(s) are involved, which API is being used, etc. In addition to finding rule violations, the system can be used to find dependencies that have not been specified by any existing rule. This feature is particularly useful in monitoring the development of the entire enterprise software platform to ensure it remains consistent, yet removes the burden of having to first anticipate potential problems and develop rules to address those problems.

Product Level Dependency Checking

Figure 6:
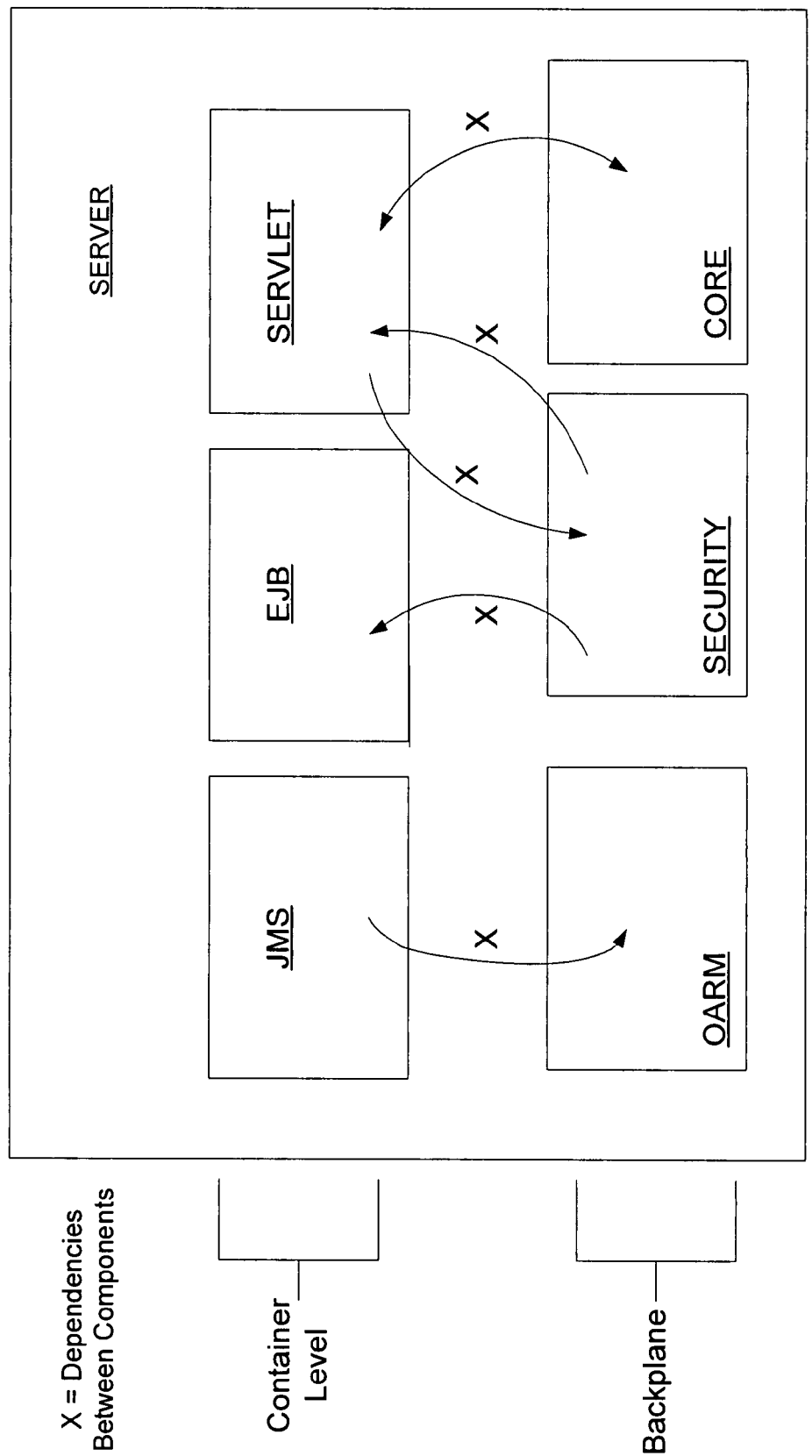
FIG. 6 shows an illustration of an application server system, including software components, and dependencies between said software components, in accordance with an embodiment of the invention.

FIG. 6 illustrates another embodiment of the invention, showing an example of how a software project or organizational component within the enterprise level system may benefit from the use of the IDARWIN approach. FIG. 6 shows an illustration of an application server system, including software components, and dependencies between said software components. As shown in FIG. 6, a software project may include various modules, such as RMI, EJB, and JMS modules, each of which may be under the control of an individual software developer or development team. During compilation, (which in fast-moving businesses with lots of builds can take place every 30-60 minutes or so), dependencies between the software modules can be identified, and checked against a set of rules. Some rules may specifically allow certain dependencies between the modules. Other rules may specifically deny or forbid other such dependencies. Often, the rules may be somewhat inapposite in what they allow or forbid, and require clarification. The set of rules themselves can be gathered from multiple sources, checked for consistencies, and sorted or rewritten for efficiency. When a rule is violated, the system can inform the responsible developer, either through some immediate pop-up report mechanism, or by email. The developer can then decide the most appropriate way to tackle the problem, typically by modifying his/her code, or by requesting a rule exemption be made for the dependency he/she is trying to introduce. In this way, each of the software modules can be more or less independently developed with less concern that the calls they either make to other modules or allow from other modules will contravene the hierarchy of architecture rules laid down for the development of the entire software project or system. This allows large-scale projects to be developed by many different software developers, each perhaps with their own style and way of programming, while ensuring a consistency among the dependencies within the project. The result is a faster and more efficient development time, coupled with a more consistent and bug-free end product. One of the important aspects of this embodiment is that the system can be used to determine contradictions between the various rules as they are applied to the components. Traditional rules-based approaches to software development are not able to assess these kinds of subtleties.

Figure 7:
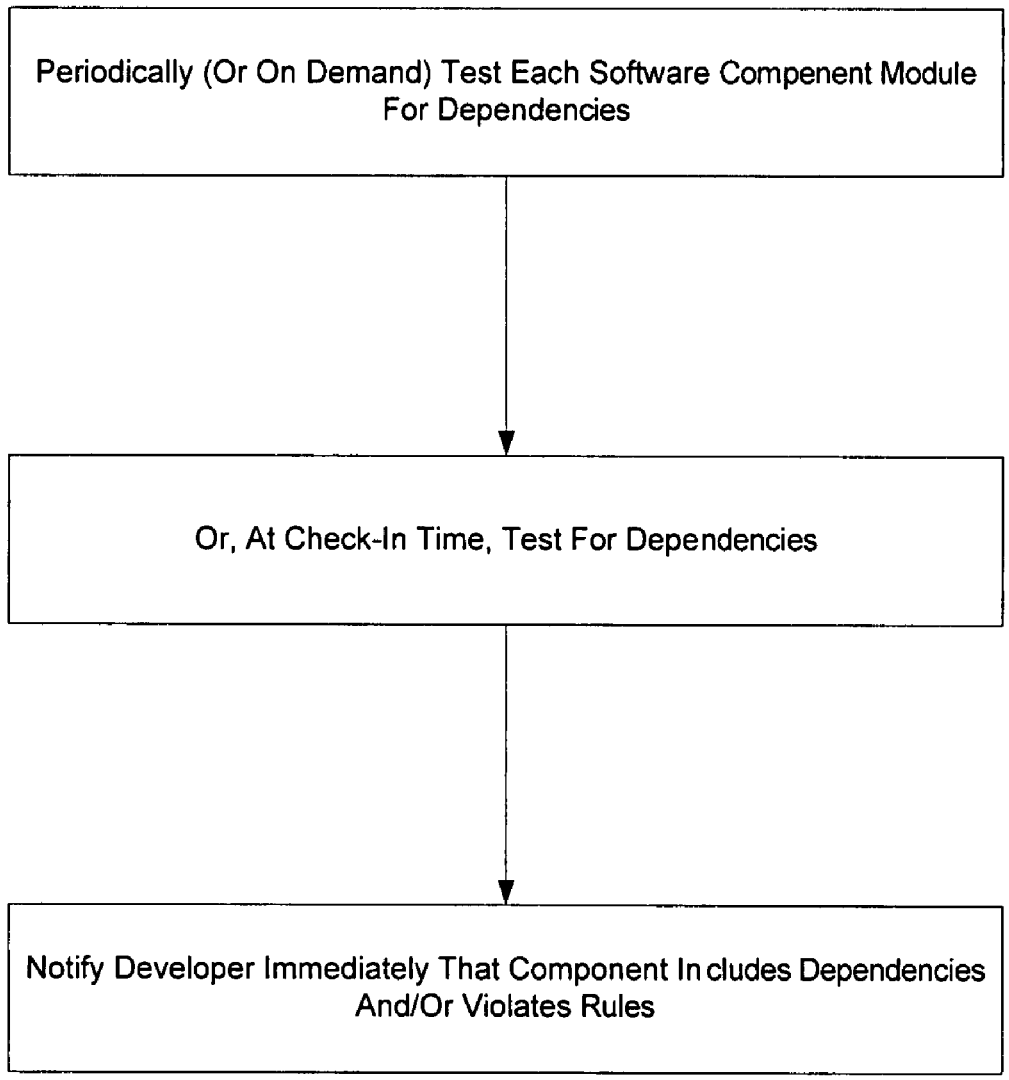
FIG. 7 shows a flowchart of a process for checking dependencies between software components, in accordance with an embodiment of the invention.

FIG. 7 shows a flowchart of a process for checking dependencies between software components, in accordance with an embodiment of the invention. Again, either on a periodic basis the system tests each component or product by running IDARWIN. The testing can also be initiated by a developer attempting to "check-in" his/her code to the system. When the system completes its tests it can immediately notify the developer and/or whoever is responsible for that code segment what dependencies it has found. The developer or architect can then decide what to do to remove or accept the dependency. In instances where a rule has already been formulated to apply to the dependency, the system will also notify whether the rule has been violated or not.

Client-Server Level Dependency Checking

Figure 8:
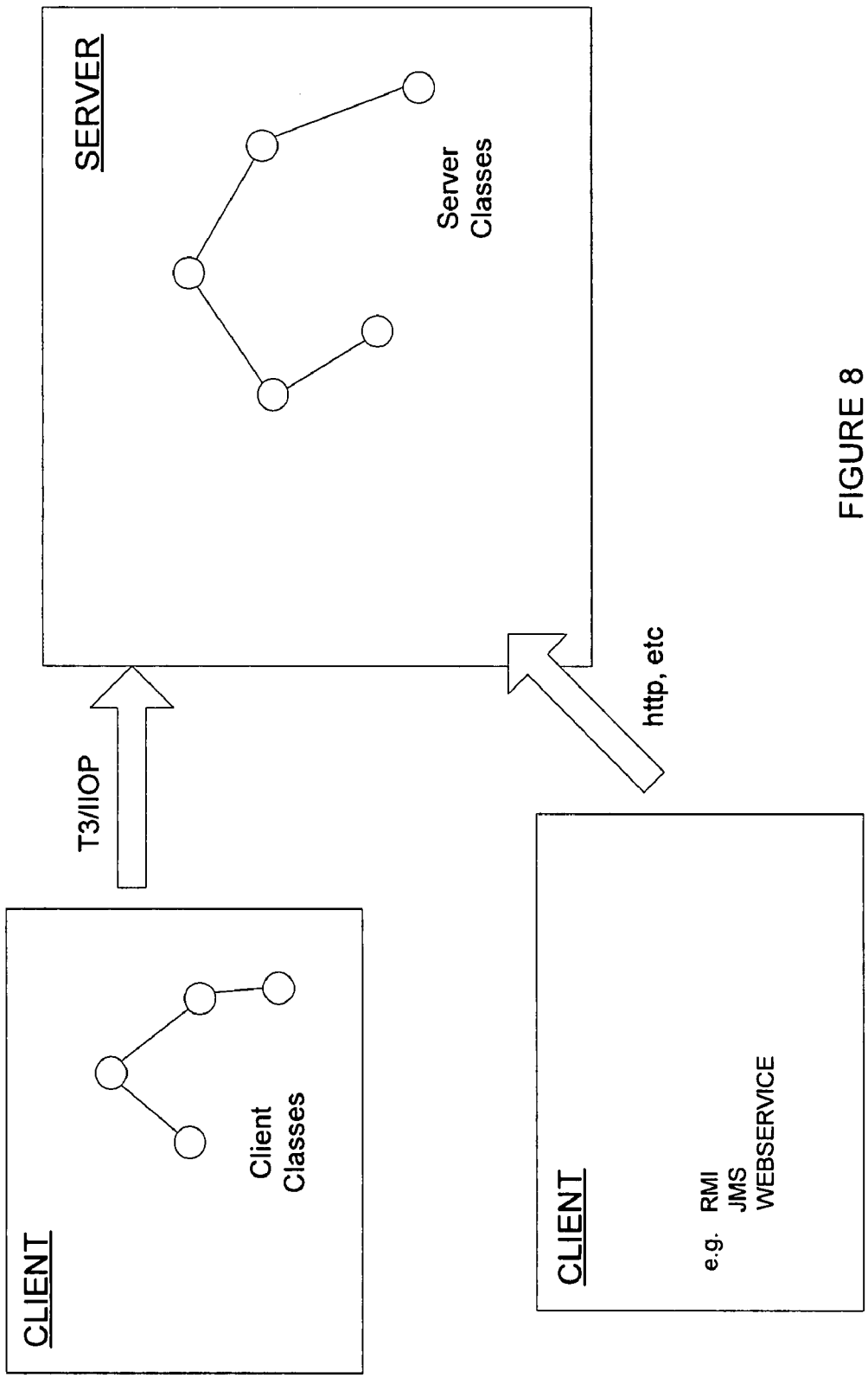
FIG. 8 shows an illustration of a client and an application server system, including a thin client, and dependencies between said thin client and said application server, in accordance with an embodiment of the invention.

FIG. 8 shows another embodiment of the invention, including a thin client, and dependencies between said thin client and an application server. The notion of a thin client is important, since it opens up the types of environment, product, or device which can interact with a particular server. Thin clients vary from simple browser-type applications to small footprint client devices and applications including wireless (WAP) devices. FIG. 8 illustrates an example in which a thin client is talking to a server, for example a WebLogic application server. The client can be any suitable client, including for example an RMI, JMS, or Web Service client. Communication with the server can be via a variety or protocols, including T3, IIOP, or http. In this example, the client utilizes Java classes located both on the client itself and on the server, to perform a variety of tasks. If the client is to remain thin it must not retrieve too many classes from the server, which would defeat the purpose of having a thin client. However, a client must still store enough classes locally to perform properly. To this end the client maintains a dependency tree of classes, as does the server. The dependency tree on the client must stay consistent—if it does not then it will begin to pull classes from the server.

The IDARWIN approach can be used to determine, and minimize dependencies between the client and the server that would otherwise cause the thin client to bloat. In accordance with one embodiment, IDARWIN is used to determine that anything going out to the client from the client JAR file located on the server is flagged as bad, i.e. as a dependency. When this happens the client build fails, and the developer is notified of the problem. They can then rewrite the errant portion of the client (and/or the server) code, and rebuild the client, again using IDARWIN to test the dependencies. Optimum use of this system requires a measure of knowledge on the part of the developer since the IDARWIN test represents a static analysis of the client-server interaction. An experienced developer may know that during run time a particular dependency will not be utilized and so can be ignored. The developer can then, if they so choose, override the test results by adding a new rule exempting that dependency. In one embodiment this is as simple as adding the dependency to an "Okay" list—the JAR files which are listed therein are ignored at test time. Using the IDARWIN approach, thin clients can be accurately developed so that they do not grow in use, but instead remain consistently thin.

Figure 9:
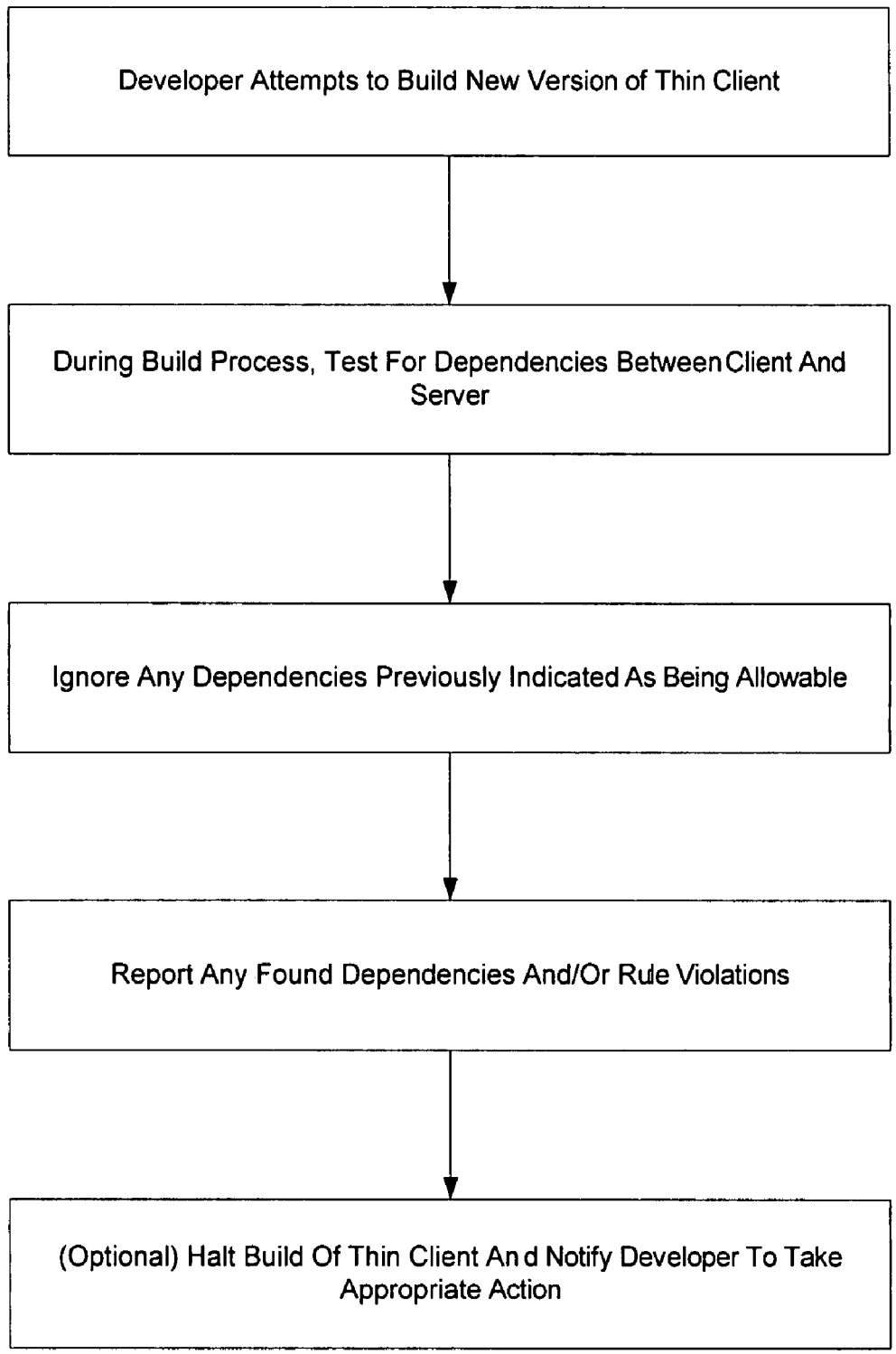
FIG. 9 shows a flowchart of a process for checking dependencies between a thin client and an application server, in accordance with an embodiment of the invention.

FIG. 9 shows a flowchart of a process for checking dependencies between a thin client and an application server, in accordance with an embodiment of the invention. As shown in FIG. 9, a developer attempts to build a new version of the thin client. During the build process, the system tests for dependencies between the client and the server. Dependencies may be already set as being allowable, in which case they are ignored. Other dependencies which are either forbidden, or which are hereto forth unknown, cause the build to deliberately fail. The developer is then notified of the potential problem, and can act accordingly.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers and computing environments may use and benefit from the invention.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for dependency checking among a plurality of interrelated software products, said system comprising:
   a microprocessor;
   a software project comprising a plurality of interrelated software products, wherein two or more of the interrelated software products include dependencies;
   a plurality of specifications that are associated with said software products, comprising a first specification associated with a first software product and a second specification associated with a second software product, and wherein for each software product the associated specification specifies rules defining any dependencies that are allowable and forbidden within that software product;
   a predefined set of rules for the software project, the predefined set of rules of the software project defining allowable and forbidden dependencies between said interrelated software products within the software project, wherein said dependencies arise when any of the said software products calls upon any of the other said software products within the project;
   a rules-based compliance checking routine that runs tests to check the compliance of any dependencies between the specifications associated with the two or more of said interrelated software products within said software project according to said predefined set of rules for the software project; and
   a report device executed by the microprocessor that reports the results of said tests.

2. The system of claim 1 wherein the predefined set of rules for the software project define the dependencies allowed, forbidden, and required for the associated interrelated software products.

3. The system of claim 1 wherein said interrelated software products comprise any of server products, integration products, portal products, and integrated development environment products.

4. A method for dependency checking for a software project, said software project including a plurality of interrelated software products, said method comprising the steps of:
- reading a plurality of specifications associated with the plurality of interrelated software products included in the software project, wherein two or more of the interrelated software products include dependencies, the specifications specifying rules defining dependencies which are allowable and forbidden within the software products;
- defining a set of rules for the software project that define allowable and forbidden dependencies between said interrelated software products within the project, wherein said dependencies arise when any of the said software products calls upon any of the other said software products within the project;
- running tests to check the compliance of any dependencies between the specifications associated with the two or more of said interrelated software products within said project against the set of rules for the software project; and,
- reporting the results of said tests.

5. The method of claim 4 wherein the set of rules for the software project define the dependencies allowed, forbidden, and required for the associated interrelated software products.

6. The method of claim 4 wherein said interrelated software products comprise any of server products, integration products, portal products, and integrated development environment products.

7. A system for inter-software component dependency checking, comprising:
- a microprocessor;
- a software project comprising a plurality of interrelated software components, wherein two or more of the interrelated software components include dependencies;
- a plurality of specifications that are associated with said software components, comprising a first specification associated with a first software component and a second specification associated with a second software component, and wherein for each software component the associated specification specifies rules defining any dependencies that are allowable and forbidden within that software product;
- a predefined set of rules for the software project, the predefined set of rules of the software project defining allowable and forbidden dependencies between said interrelated software components within the software project, wherein said dependencies arise when any of the said software components calls upon any of the other said software components within the project;
- a rules-based compliance checking routine that runs tests when a software component is modified, to check the compliance of any dependencies between the specifications associated with the modified software component and at least one other interrelated software component within said software project according to said predefined set of rules for the software project; and
- a report device executed by the microprocessor that reports the results of said tests.

8. The system of claim 7 wherein the set of rules for the software project define the dependencies allowed, forbidden, and required for the associated interrelated software components.

9. The system of claim 8 wherein said interrelated software components comprise any of RMI, EJB, and JMS components and modules.

10. A method for inter-software component dependency checking for a software project, said software project including a plurality of interrelated software components, comprising the steps of:
- reading a plurality of specifications associated with the plurality of interrelated software components included in the software project, wherein two or more of the interrelated software components include dependencies, the specifications specifying rules defining dependencies which are allowable and forbidden within the software project;
- defining a set of rules for the software project that define allowable and forbidden dependencies between the interrelated software components within the project, wherein said dependencies arise when any of the said software components calls upon any of the other said software components within the project;
- running a rules-based compliance check when a software component is modified, to examine the dependencies between the specifications associated with the said modified software component and at least one other interrelated software component within said project according to said rules for the software project; and,
- reporting the results of said tests.

11. The method of claim 10 wherein the set of rules for the software project define the dependencies allowed, forbidden, and required for the associated interrelated software components.

12. The method of claim 10 wherein said interrelated software components comprise any of RMI, EJB, and JMS components and modules.

13. A computer readable medium including instructions stored thereon which when executed cause the computer to perform the steps of:
- reading a plurality of specifications associated with a plurality of interrelated software products included in a software project, wherein two or more of the interrelated software products include dependencies, the specifications specifying rules defining dependencies which are allowable and forbidden within the software products;
- defining a set of rules for the software project that define allowable and forbidden code dependencies between said interrelated software products within the project, wherein said dependencies arise when any of the said software products calls upon any of the other said software products within the project;
- running tests to check the compliance of any dependencies between the specifications associated with the two or more of said interrelated software products within said project against the set of rules for the software project; and,
- reporting the results of said tests.

14. A computer readable medium including instructions stored thereon which when executed cause the computer to perform the steps of:
- reading a plurality of specifications associated with a plurality of interrelated software components included in a software project, wherein two or more of the interrelated software components include dependencies, the specifications specifying rules defining dependencies which are allowable and forbidden within the software project;
- defining a set of rules for the software project that define allowable and forbidden code dependencies between said interrelated software components within the project, wherein said dependencies arise when any of the said software components calls upon any of the other said software components within the project;

running a rules-based compliance check when a software component is modified, to examine the dependencies between the specifications associated with the said modified software component and at least one other interrelated software component within said project according to said rules for the software project; and, reporting the results of said tests.

15. The system of claim 1 wherein said rules-based compliance checking routine automatically allows, forbids, and constrains the code dependencies between the specifications associated with the interrelated software products within said software project according to said predefined set of rules for the software project.

16. The system of claim 1 wherein said rules-based compliance checking routine runs tests when the software project is built to examine the dependencies between the specifications associated with the two or more of said interrelated software products within said software project according to said predefined set of rules for the software project.

17. The method according to claim 4, further comprising:
automatically allowing, forbidding, and constraining the code dependencies between the specifications associated with the interrelated software products within said software project according to said set of rules for the software project.

18. The method according to claim 4, further comprising:
running tests to examine the code dependencies between the specifications associated with the two or more of said interrelated software products within said software project when said software project is built according to said set of rules for the software project.

19. The system of claim 7 wherein said rules-based compliance checking routine automatically allows, forbids, and constrains the code dependencies between the specifications associated with the modified software component and other software components, software products, software modules, building blocks, and organization components that make up the software project according to said set of rules for the software project.

20. The method according to claim 10, further comprising:
automatically allowing, forbidding, and constraining the code dependencies between the specifications associated with the modified software component and other software components, software products, software modules, building blocks, and organization components that make up the software project according to said set of rules for the software project.

21. The computer readable medium including instructions stored thereon according to claim 13, which when executed cause the computer to perform the step of:
automatically allowing, forbidding, and constraining the code dependencies between the specifications associated with the interrelated software products and other software components, software modules, building blocks, and organization components that make up the software project according to said set of rules for the software project.

22. The computer readable medium including instructions stored thereon according to claim 13, which when executed cause the computer to perform the step of:
running tests to examine the dependencies between the specifications associated with two or more of said interrelated software products within said software project when said software project is built according to said set of rules for the software project.

23. The computer readable medium including instructions stored thereon according to claim 14, which when executed cause the computer to perform the step of:
automatically allowing, forbidding, and constraining the code dependencies between the specifications associated with said modified software component and other software components, software products, software modules, building blocks, and organization components that make up a the software project according to said set of rules for the software project.

* * * * *

UNITED STATES PATENT AND TRADEMARK OFFICE
CERTIFICATE OF CORRECTION

PATENT NO. : 7,434,202 B2
APPLICATION NO. : 10/785757
DATED : October 7, 2008
INVENTOR(S) : Kramer It is certified that error appears in the above-identified patent and that said Letters Patent is hereby corrected as shown below:

On Title page, in Item (56), in column 2, under "Other Publications", line 1, delete "iDarwin" and insert -- IDarwin --, therefor.

On sheet 3 of 9, in Figure 3, Ref. Numeral 172, line 1, delete "particul ar" and insert -- particular --, therefor.

On sheet 3 of 9, in Figure 3, Ref. Numeral 174, line 1, delete "et c." and insert -- etc. --, therefor.

On sheet 3 of 9, in Figure 3, Ref. Numeral 178, line 1, delete "c ontradictions," and insert -- contradictions, --, therefor.

On sheet 3 of 9, in Figure 3, Ref. Numeral 178, line 2, delete "or der" and insert -- order --, therefor.

On sheet 3 of 9, in Figure 3, Ref. Numeral 180, line 1, delete "complia nce" and insert -- compliance --, therefor.

On sheet 3 of 9, in Figure 3, Ref. Numeral 182, line 2, delete "dep endencies," and insert -- dependencies, --, therefor.

On sheet 7 of 9, in Figure 7, Box No. 1, line 1, delete "Compenent" and insert -- Component --, therefor.

On sheet 7 of 9, in Figure 7, Box No. 3, line 1, delete "In cludes" and insert -- Includes --, therefor.

On sheet 9 of 9, in Figure 9, Box No. 5, line 1, delete "An d" and insert -- And --, therefor.

In column 2, line 34, delete "Their" and insert -- There --, therefor.

In column 3, line 10, after "i.e." delete "with in" and insert -- within --, therefor.

In column 3, line 10, after "or" delete "with in" and insert -- within --, therefor.

In column 4, line 27, delete ""make'" and insert -- "make" --, therefor.

In column 5, line 9, delete "h&ps" and insert -- helps --, therefor.

In column 5, line 39, delete ",i.e." and insert -- , i.e. --, therefor.

In column 6, line 49, delete "176,178" and insert -- 176, 178 --, therefor.

CERTIFICATE OF CORRECTION (continued)
U.S. Pat. No. 7,434,202 B2

In column 9, line 21, delete "Java" and insert -- JAVA™ programming language --, therefor.

In column 9, line 44, delete "run time" and insert -- runtime --, therefor.

In column 10, line 61, in claim 1, delete "and" and insert -- and, --, therefor.

In column 11, line 61, in claim 7, delete "and" and insert -- and, --, therefor.

In column 14, line 38, in claim 23, delete "a the" and insert -- the --, therefor.

Signed and Sealed this

Thirteenth Day of April, 2010

David J. Kappos
*Director of the United States Patent and Trademark Office*